(12) United States Patent
Sundararajan

(10) Patent No.: US 6,487,577 B1
(45) Date of Patent: Nov. 26, 2002

(54) DISTRIBUTED COMPILING

(75) Inventor: Muralidharan Sundararajan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/106,831

(22) Filed: Jun. 29, 1998

(51) Int. Cl.[7] ............................................. G06F 9/00
(52) U.S. Cl. .................... 709/102; 709/106; 717/140; 717/149; 717/158
(58) Field of Search ................ 709/100, 101, 709/102, 103, 104, 105, 106, 107, 226, 229; 717/139, 140, 149, 158

(56) References Cited

U.S. PATENT DOCUMENTS

| | | | | |
|---|---|---|---|---|
| 4,885,684 A | * | 12/1989 | Austin et al. ............... | 717/149 |
| 5,369,570 A | * | 11/1994 | Parad ............................ | 705/8 |
| 5,428,783 A | * | 6/1995 | Lake ............................ | 709/106 |
| 5,442,791 A | * | 8/1995 | Wrabetz et al. .............. | 709/330 |
| 5,623,666 A | * | 4/1997 | Pike et al. ................... | 707/200 |
| 5,963,447 A | * | 10/1999 | Kohn et al. ................... | 700/49 |
| 6,128,315 A | * | 10/2000 | Takeuchi .................... | 370/466 |
| 6,195,676 B1 | * | 2/2001 | Spix et al. ................... | 709/107 |
| 6,226,644 B1 | * | 5/2001 | Ciscon et al. ................. | 707/10 |

* cited by examiner

*Primary Examiner*—Majid Banankhah
(74) *Attorney, Agent, or Firm*—Blakely, Sokoloff, Taylor & Zafman LLP

(57) ABSTRACT

A method and apparatus for distributing compiling jobs among a number of sub-contractor computers in a network is described. The method involves publishing job-shops, which are computer capability descriptions of the sub-contractor computer to a network resource scheduler computer. The network resource scheduling computer compares modules of a compiling task sent from client computers with the published job-shops and forwards the modules as jobs to the chosen sub-contractor computer for completion.

21 Claims, 10 Drawing Sheets

DISTRIBUTED COMPILING

BACKGROUND

(1) Field

The present invention relates generally to a system for distributing compiling tasks over several computers connected via a local area or wide area network. More particularly, the present invention relates to distributing compiling tasks to a number of networked sub-contractor computers, each networked sub-contractor computer publishing its capability and availability to a network resource scheduler computer which receives the compiling tasks from a client computer. The networking resource scheduler computer matches the compiling tasks to an appropriate sub-contractor computer.

(2) General Background

In recent years, wide area networks ("WAN") have become an important part of the day to day lives of many computer owners. Every day millions of users connect to the most well known WAN, the Internet. Nearly every personal computer ("PC") user having a modem and a telephone line can access the Internet for minimal cost through commercial companies that provide a gateway to the Internet. Available Internet services include E-Mail, database access, and news groups. The Internet also acts as a service medium for many companies trying to market products.

Many of the personal computers which are connected to WANs are high powered personal computers which may contain microprocessors, such as the Intel Pentium® or Pentium®Pro microprocessor. These personal computers may also include RAM memory, a display unit, long-term storage such as a hard disk drive, and other proprietary processors such as video graphic cards and math co-processors. These independent, stand-alone computers are idle for a significant portion of the day. For example, a personal computer owned at home may be idle or even off while the owner is away at work. The computer may also be idle at night while the owner is asleep. A personal computer at the office may only be utilized from 9 A.M. in the morning till 5 P.M. in the evening. At any particular time, peak usage in one part of the world can be offset by low usage in a different part of the world. For example, periods of high computer usage in New York City may be night time in Tokyo when idle personal computers are readily available. It would be advantageous to utilize the wasted idle time of these computers. More generally, a method of using an entire network of computers as one massive parallel computing machine to solve particular tasks is desirable.

One particular task that is particularly suitable for such parallel distributed computing are compiling tasks. Such compiling tasks are typically made up hundreds of little components which have no dependency on one another during compile time. For example, in some compiling systems, a computer assembles hundreds of components over extended periods of time. By distributing the task over many computers, the component building could be completed much quicker, saving months from a project's life cycle.

A system which uses PCs coupled to an Internet service provider ("ISP") to satisfy compiling tasks is ideally dynamic and easily modifiable. Each computer connecting to the ISP may be independently owned and individual owners may frequently change their personal computer system characteristics. Furthermore, new subscribers are frequently being added to the ISP network, while other owners are dropping the ISP service. Major ISPs have a "churn" rate of thousands of computers adding and dropping the service every year.

Thus, it is desirable to have a dynamic, accommodating system capable of operating a network of computers on a wide area network as one massive parallel computing machine to handle complicated tasks such as compiling.

BRIEF SUMMARY

A method of compiling is described. A system for compiling receives a plurality of modules, each module in the plurality of modules representing a portion of a compiling task. The system chooses a plurality of corresponding sub-contracting computers to process the plurality of modules based on job-shops generated by the corresponding sub-contracting computers. The system transmits each module as a job to a corresponding sub-contracting computer and combines the output of the sub-contracting computers to generate a compiled task.

DETAILED DESCRIPTION OF THE INVENTION

The present invention relates to a method and apparatus for distributing tasks from a network of computers to remote computers over a network, usually a wide area network. In the following description, the following terms will be used to describe the various embodiments of the invention. A wide area network ("WAN") is a data network which is not restricted in terms of distance. Typical distances can be larger than 100 kilometers. A local area network ("LAN") is a data network which is restricted in distance. Typically distances between computers in a LAN are 500 meters or less. Typical LAN networks include Ethernet and Token Ring Networks.

Most WANs are made up of a collection of packet switching networks which are physically interconnected by protocol gateways. The protocol gateways allow the WAN to function as a large, composite network. The Internet is a WAN connecting thousands of disparate networks including LANs in industry, education, government, and research. The Internet network uses a transmission control protocol/Internet protocol ("TCP/IP") as a standard for transmitting information. TCP/IP is a set of communication protocols that support peer-to-peer connectivity functions for WANs. The Internet protocol works in an Internet layer delivering Internet protocol packets to the proper destinations. The Internet layer permits hosts to inject data packets into any network and have them travel independently to their intended destination (potentially on a different network). The packets may arrive in a different order than they were sent, in which case a higher level system must rearrange the data packets in the proper delivery order.

Although most of the invention will be described using specific examples such as an Internet implementation using "publication" of data, it should be recognized that such examples are used to facilitate understanding of the invention and unless specifically claimed should not be interpreted to limit the invention.

Figure 1:
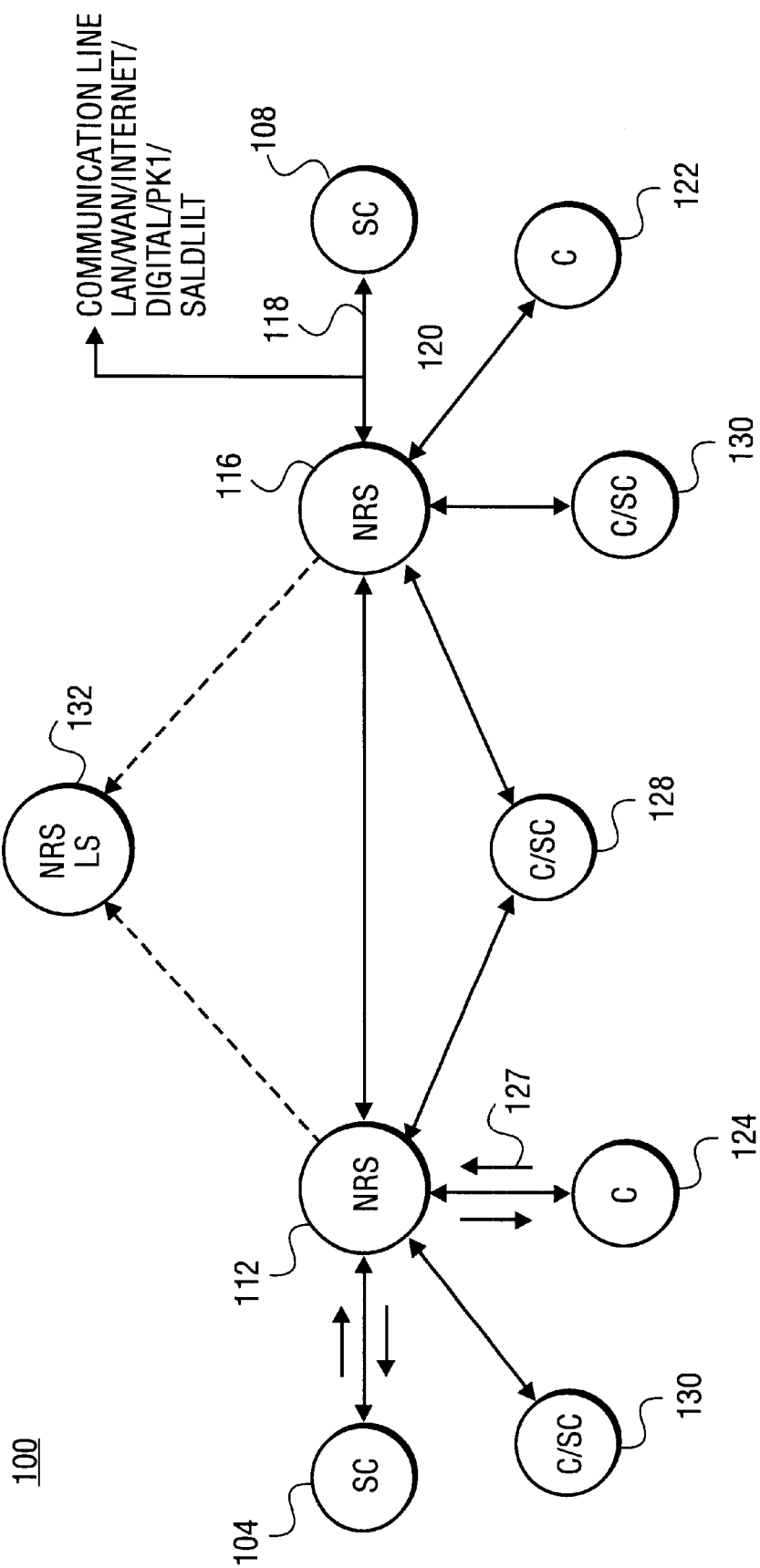
FIG. 1 is a diagram illustrating one possible set of connections between computers.

FIG. 1 illustrates a schematic diagram showing the interconnects between various computer systems. In the illustrated network 100, sub-contractor computers 104, 108 are connected to network resource scheduler computers 112 and 116. The network resource scheduler computers (NRS computer) 112, 116 typically maintains a database of sub-contractor computers (SC computers) 104, 108 connected to or subscribing to a NRS computer. Each SC computer 104, 108 publishes its capabilities and availability to at least one corresponding NRS computer 112, 116. Communication links, such as communication link 118, couple SC computers 104, 108 to corresponding NRS computers, such as NRS computer 116. The communication link 118 may be implemented as a local area network (LAN), wide area network (WAN), Internet connection, digital packet connection, or satellite link. In one embodiment, the communications link is defined using an interface definition language (IDL) which is an industry standard for specifying interfaces. The IDL enables two software entities to agree upon an interface. Interface providers are designed to comply with the usage models dictated by the interface. Thus one software module may communicate with any provider using the interface because information is in conformance with the interface. In the preferred embodiment, the IDL language is used to define the interface between the NRS computer 116 and the SC computer 108 and also as the interface between the NRS computer 116 and the client computer.

In one embodiment of the invention, each NRS 112, 116 is coupled to at least one corresponding client 124, 122 via a corresponding communications link 126, 120. Communication link 120 which couples a client computer 122 to a corresponding NRS 116 may communicate using the IDL protocol. Client computer 122, 124 is a computer that transmits jobs to the corresponding NRS. A "job" is typically binary data which describes a task to be performed. In the preferred embodiment, a job is a binary large object (BLOB) that is tagged with a job type identification so that the NRS computer knows the type of job being submitted. The job type identification can be referenced in a field of a database to provide the SC computer with information on steps to be executed to complete the job. In one embodiment, the job identification is a numeric code which specifies various operations such as data compression or matrix multiplications.

Although FIG. 1 illustrates client 122 coupled to a corresponding NRS 116 via communication line 120 and client 124 coupled to a second corresponding NRS 112 via communication line 126, it is recognized that the client computers 122, 124 may query other NRS computers and choose to submit a job to a different NRS computer. Thus a client computer is not limited to one NRS computer. The client computer may choose to submit a job to a different NRS because the different NRS may have advantages in terms of price or a more suitable pool of corresponding SC computers. It should also be noted that a client computer and a sub-contractor computer are not mutually exclusive entities. Thus a computer may perform the functions of both a client computer and a sub-contractor computer such as C/SC computers 126, 128 and 130.

NRS computers 112, 116 maintain a database of SC computers 104, 108, 126, 128, 130 (the SC computers are defined to include both pure SC computers 104, 108 and dual purpose C/SC computers 126, 128, 130) that have published themselves as being available. Publication is usually done via a job-shop. A job-shop is an object that describes a capability set of a SC computer with respect to performing a particular type of job. For example, typical job-shops may include-very fast number processing routines such as matrix multiplication and graphics image conversion. A SC computer capable of handling both fast number processing routines and graphics image conversions is specified as having two job-shops, a number crunching job-shop and a graphics job-shop. Each job-shop transmitted to the NRS computer preferably includes information about the computer speed and capabilities in executing each job or task. The published information allows the NRS computer to review the published capabilities of each SC computer and choose an SC computer which is available and capable of efficiently performing the tasks corresponding to the job.

Each computer and each job-shop is associated with a universally unique identification number (UUID). The UUID uniquely identifies the job across the network. One method of implementing the UUID is as a 128 bit integer similar to a Global unique identifier (GUID) in an OLE environment. Such UUID may be generated by combining an Ethernet address with a time, a date and a random number. Such generation of UUID's are described in pages 5 and pages 65–68 of the *Microsoft RPC Programming Guide* by John Shirley and Ward Rosenberg published by O'Reilly and Associates, Inc., 1995.

In one embodiment of the invention, each NRS computer 112, 116 further provides information to a network resource scheduler location service (NRS/LS) computer. The NRS/LS computer is a repository of dynamic information. NRS computers 112, 116 register with a NRS/LS computer so that client computers 124, 122, 126, 128, 130 (client computers are defined to include computers which are only clients 122, 124 and combination C/SC computers 126, 128, 130) can query the NRS/LS computer 132 for information needed to select an NRS computer 112, 116. One such arrangement implements the NRS/LS computer 132 as a server computer maintaining an Internet web site accessible to client computers 122, 124, 126, 128, 130. Information on the web site assists the client computer in selecting a NRS computer.

One typical use of the system illustrated in FIG. 1 is to handle compile tasks. Thus, the typical client computer, such as computer 124, may be a distributed compiling ("D-Comp") computer. The D-comp computer may take compiling tasks, break them down, and transmit each separate compiling task as a job to the NRS 112. In an alternate embodiment, the D-Comp computer may be a "dedicated" NRS; Such a "dedicated" NRS would only have compiling tasks, and accept SC computers that are suitable for handling compiling tasks. The "dedicated" NRS or D-comp computer would accept aggregate compiling tasks as a job, break down those aggregate compiling tasks into separate, smaller jobs, and match the smaller jobs with the job shops published by the SC computers. Because of the complexity of compiling tasks, it is preferred to implement the D-comp computer as an NRS rather than as a client. Implementing the D-comp computer as an NRS allows the compiling tasks to be broken up within the NRS rather than in a client computer, which then subsequently has to transmit the numerous individual jobs to each NRS 112 to be forwarded to SC computers. More detailed descriptions of the operation of a "dedicated" NRS is described in FIGS. 8 and 9.

Figure 2:
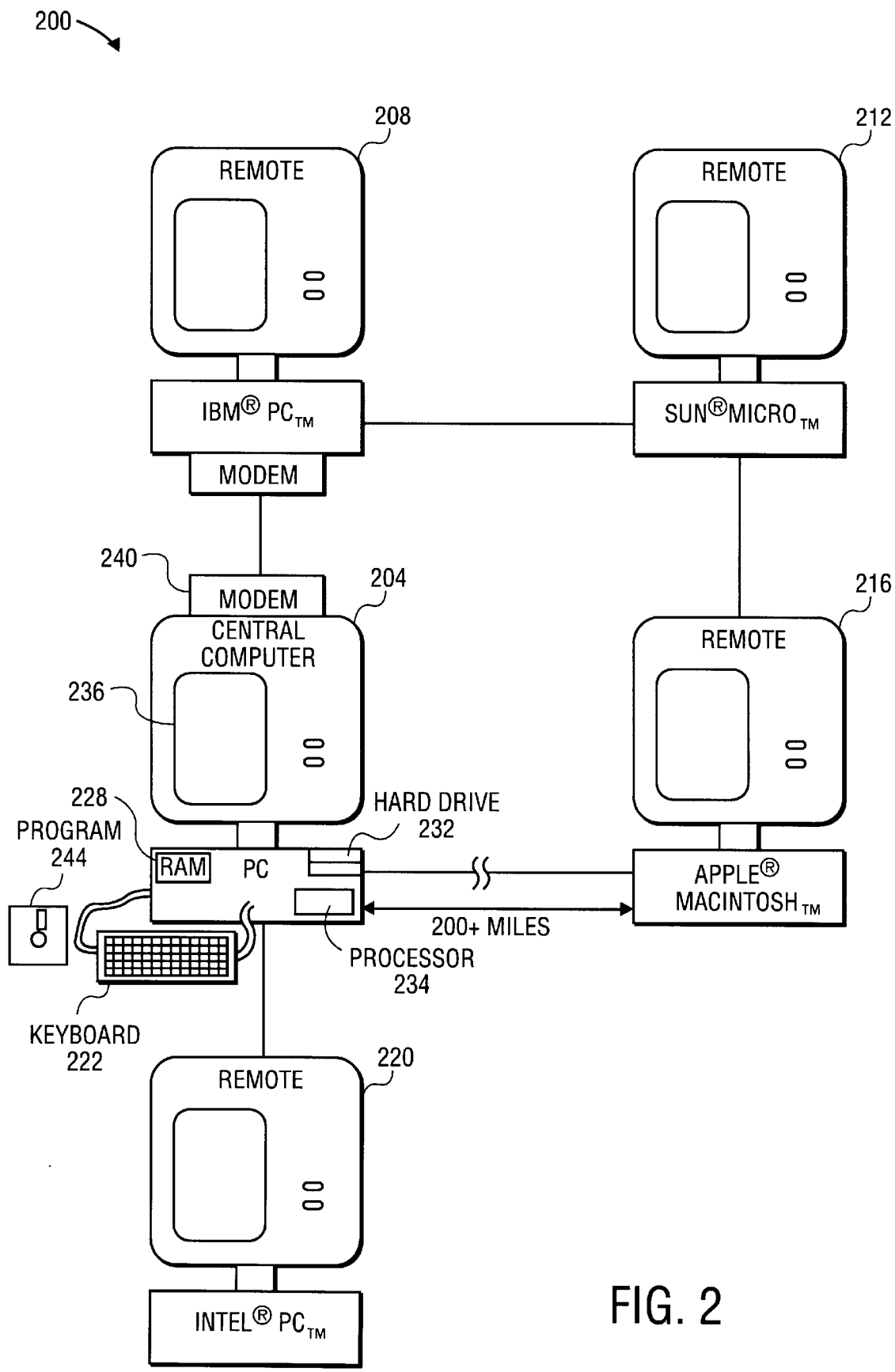
FIG. 2 is an illustrated block diagram in one embodiment of the distributed system including a central computer and remote computer.

FIG. 2 is an illustration of the computer network 200. The computer network 200 includes a central computer or network resource scheduler (NRS) computer 204 and a plurality of remote computers 208, 212, 216 and 220. The remote computers include both SC computers, client computers and combination SC/C computers. Each computer including both, the NRS computer and the remote computers may be a variety of different types of computers from different computer vendors e.g. an IBM® computer 208, an Apple® computer 216, and a Sun® workstation 212. In the illustrated embodiment, each computer is a personal computer ("PC") with microprocessors and other independent computer components. The independent computer components include a keyboard 222, a processor 234, a random access memory 228, a long term storage device (e.g., hard drive) 232 and a display device 236.

Each computer is coupled to other computers in the Internet network via a variety of communication techniques, including but not limited to ISDN lines, typical telephone lines, cable modems, satellite transmission, fiber optic cable or other emerging as well as established communication techniques. When standard analog telephone lines are used, a modem device 240 is used to convert the digital information into analog information for transmission along standard twisted pair telephone line. Typically, the network is a wide area network WAN and the computers may be separated by hundreds or even thousands of miles. Thus, radio signals or other communication technologies may be used to allow the NRS computer to communicate with the remote computer computers.

Many protocols are available for connecting the NRS computer 204 to the remote computers 208, 212, 216, 220. In particular, packet based protocols are preferred. Such packet-based protocols include APPLETALK™ from Apple Computer, Inc. of Cupertino, Calif., ITUTX25 (from International Telecommunications Union Standard) or Frame Relay, and SPX/IPX from Novell. In one embodiment, Integrated Services Digital Network ("ISDN") lines may be used to connect the NRS computer with the remote computer. ISDN is a digital end-to-end telecommunication network that supports multiple services including, but not limited to voice and data. In a preferred embodiment of the invention, an Always On/Dynamic ISDN (AO/DI) is used. AO/DI is a networking service that provides an always-available connection to packet-based data services through the WAN.

Although the prior paragraph describes one method of implementing a connect-disconnect routine for connecting Internet coupled computers, other methods are also available. For example, satellite and cable modem hook-ups may be implemented.

Each SC computer publishes availability information and capabilities in a job-shop. A job-shop is an object that describes the capabilities of a SC computer with respect to a particular task or job. A SC computer, which is capable of several projects, may publish two job-shops, a matrix manipulation job-shop and a graphics image conversion job-shop.

In one embodiment of the invention, each job-shop may be published at regular periodic intervals or at prearranged times. In an alternative embodiment of the invention, polling methods of obtaining information may be used. In a polling arrangement, the task or job and a detailed description is typically transferred from, the NRS computer to the SC computer allowing the SC computer to determine whether the SC computer can complete the task. However, the transmission of a task description to each SC computer uses large amounts of interconnecting line bandwidth. In contrast, publication methods involve compacting SC computer information into job-shops. Publishing the capabilities of the SC computer in a job-shop instead of publishing the task description of the job minimize the data which must be transferred. Thus, in embodiments of the invention in which bandwidth is very limited, a publication system in which SC computers indicate availability or periodically publish status may be implemented to minimize the bandwidth drain of polling methods.

Figure 3A:
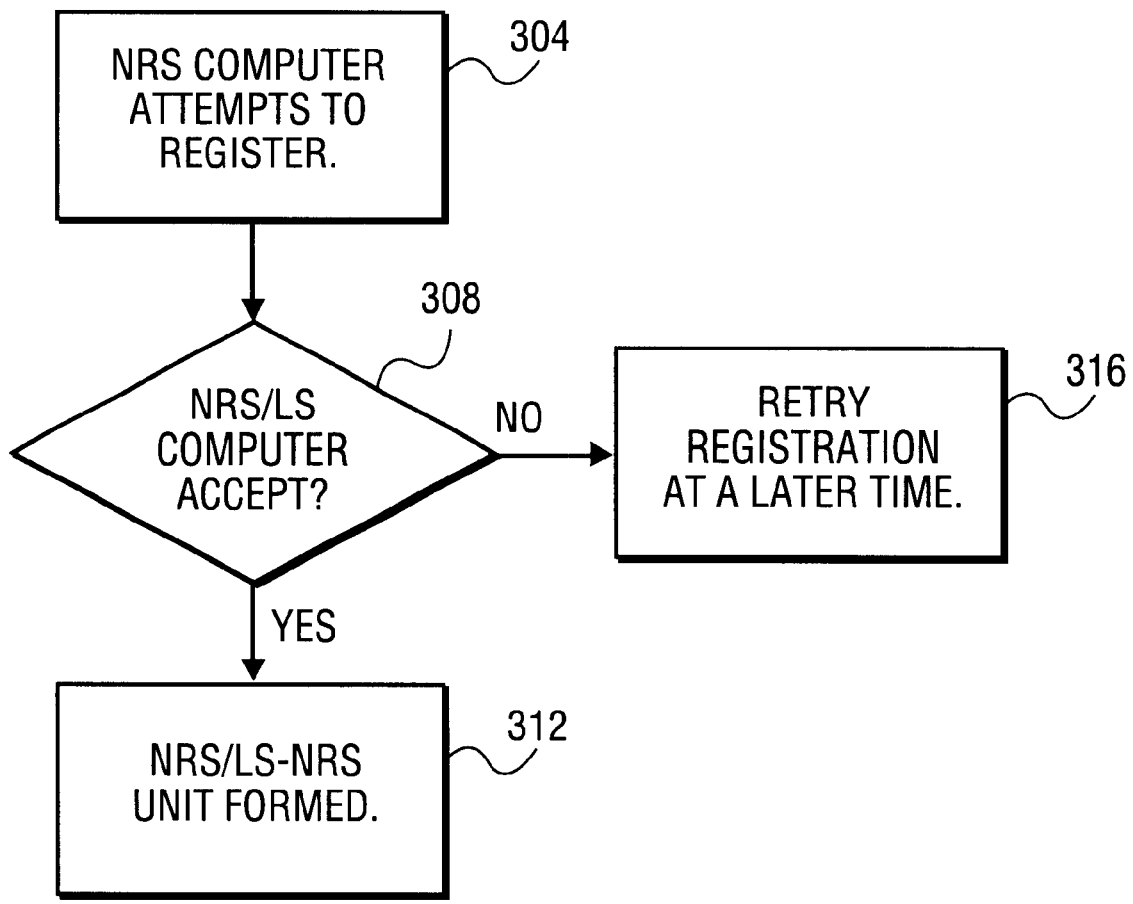
FIGS. 3A, 3B and 3C illustrate the steps taken to register the client, the sub-contractor and the network research scheduler (NRS) in a distributed computing system.
Figure 3B:
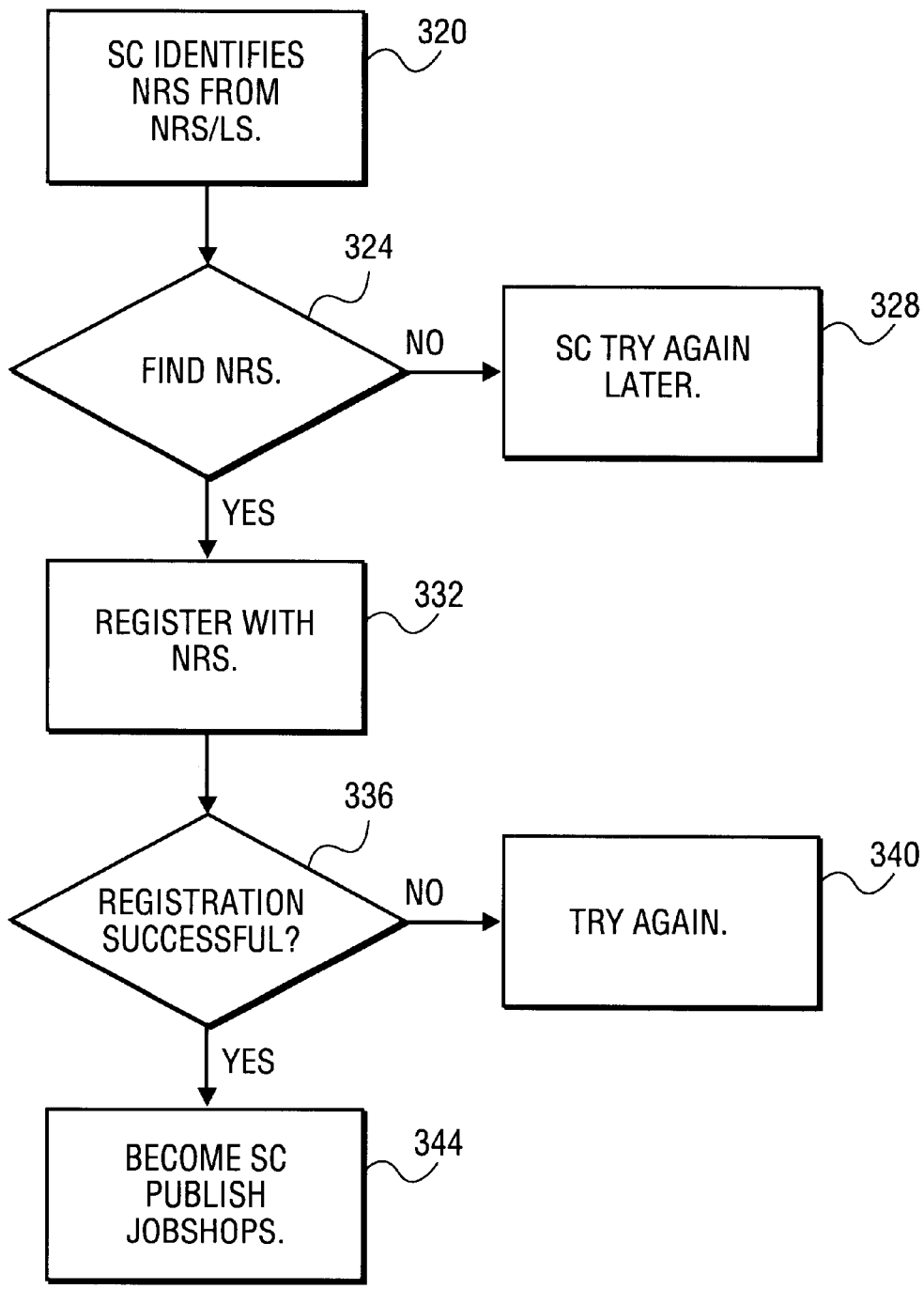
Figure 3C:
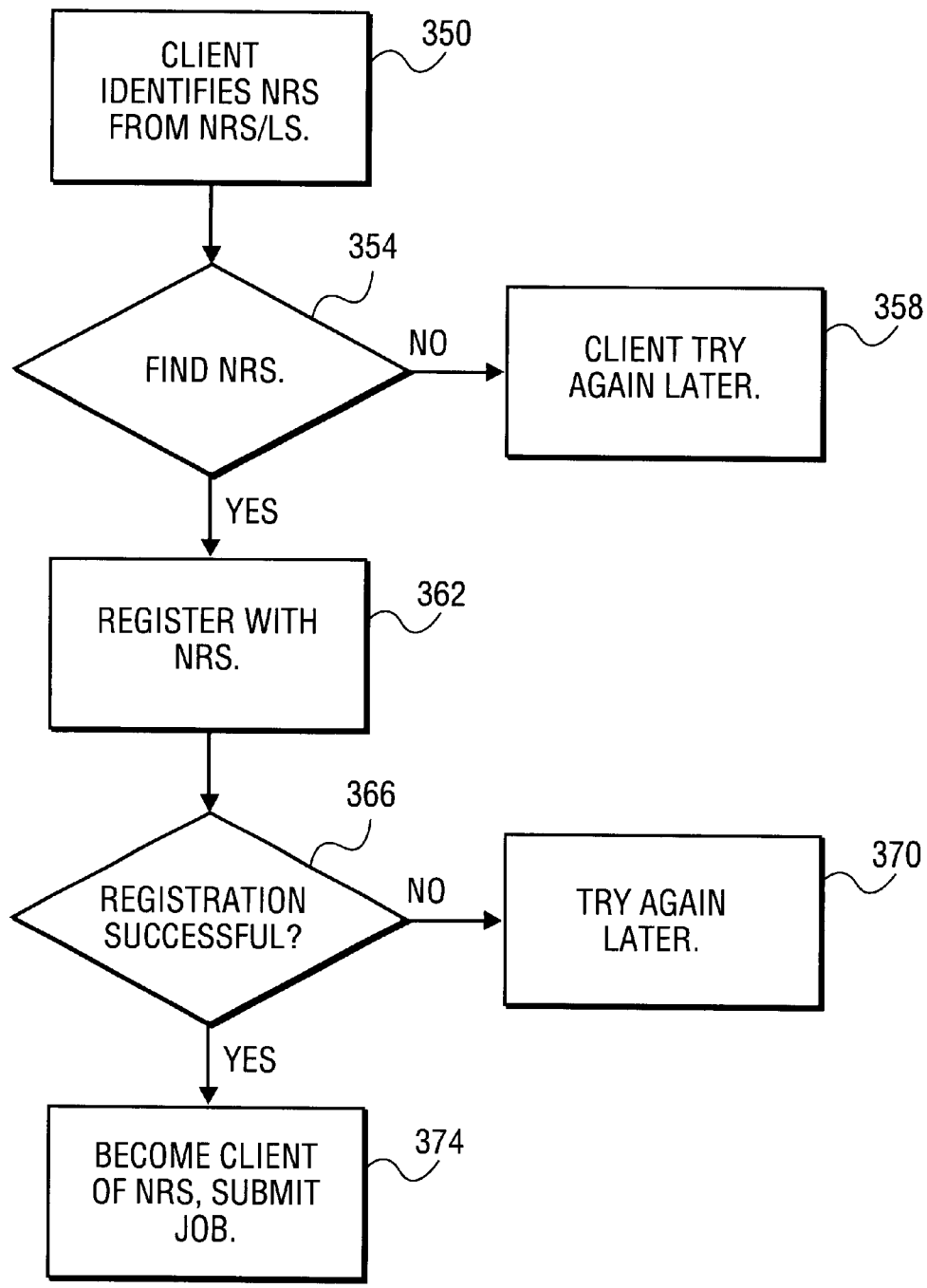

FIGS. 3A, 3B and 3C illustrate the steps taken to set up a distributed computing system. FIG. 3A illustrates a flow diagram showing the registration of a NRS with a NRS/LS. In step 304, the NRS computer attempts to register with the NRS/LS computer. If the NRS/LS computer accepts the registration in step 308, a NRS/LS-NRS unit is formed in step 312. Registration may fail if communication between the NRS/LS and the NRS cannot be established or if a NRS/LS computer already has a full complement of NRS computers. If the registration fails in step 308, the NRS computer may attempt registration with a different NRS/LS computer. Alternatively the NRS computer may retry to register at a later time in step 316.

FIG. 3B illustrates the addition of SC computers to the NRS. In step 320, the SC identifies a suitable NRS from the NRS/LS. A "suitable" NRS computer is a NRS computer that handles the type of job-shops issued by the SC computer. If the SC does not find a suitable NRS in step 324, the SC may try again later in step 328. If a NRS is identified in step 324, the SC computer registers with the NRS in step 332. Registration may fail if communication cannot be established or if a NRS computer already has a full complement of SC computers. If the registration is not successful in step 336, the SC may try registering later in step 340. If the registration in step 336 is successful, the SC publishes its job-shops in step 344. For purposes of this application, "publishes" means transmitting information without receiving a prompt or request for the information. In the preferred embodiment, "publishes" also includes periodically updating the transmitted information when a change of status occurs.

FIG. 3C illustrates client computer attempts to register with the NRS computer. In step 350 the client identifies a NRS from the NRS/LS. If the client doesn't find a suitable NRS, in step 354, the client may try again later in step 358. If a NRS is identified in step 354, the client registers with the NRS in step 362. If the registration is not successful in step 366, the client computer may try registering at a later time in step 370. If the registration in step 366 is successful, the client may begin submitting jobs to the NRS in step 374.

Figure 4:
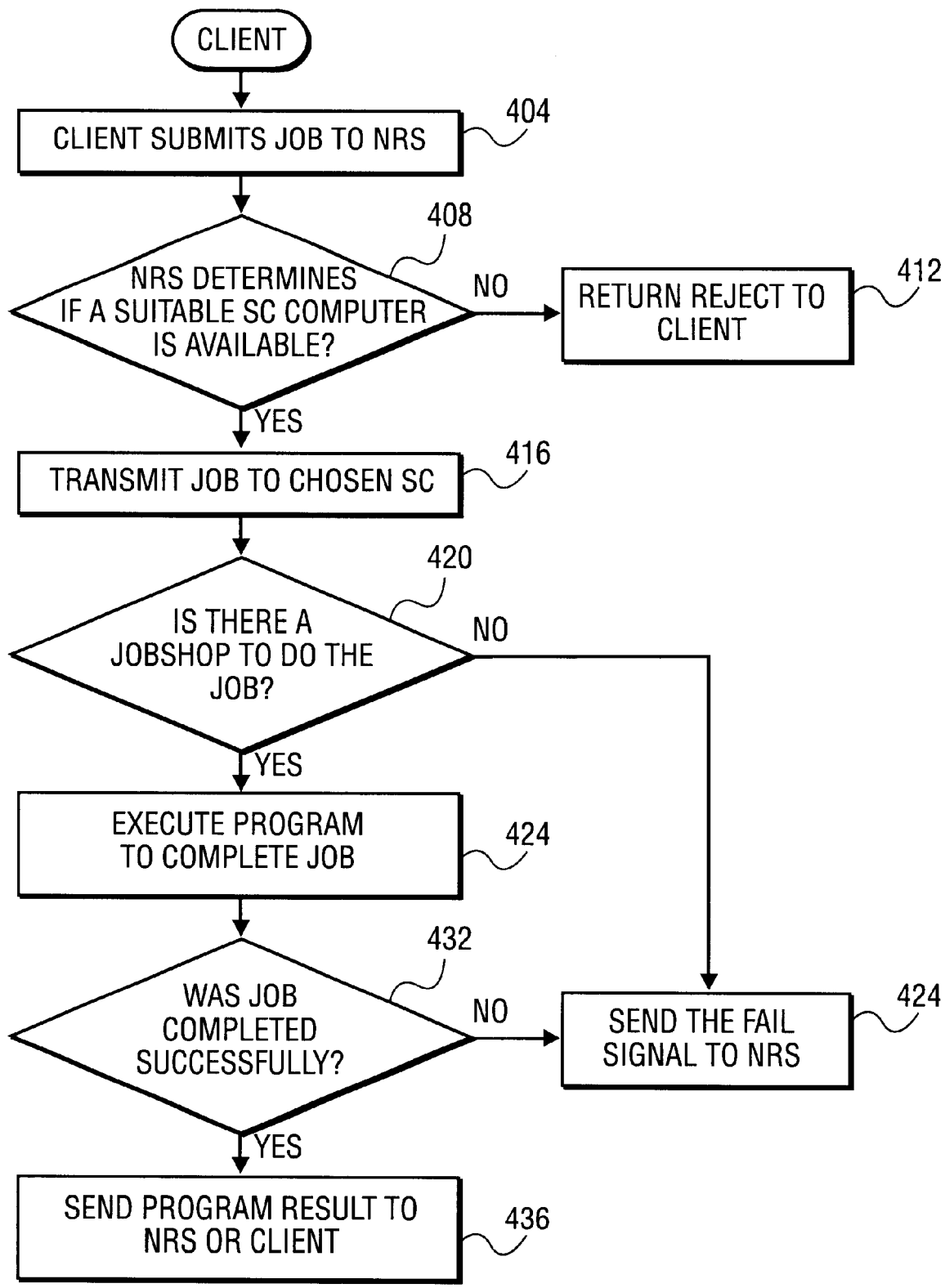
FIG. 4 is a flow diagram which illustrates the procedures used to process a job from a client computer submitted to a Network resource scheduling computer.

FIG. 4 is a flow diagram illustrating the steps taken by a NRS computer to process a job received from a client computer. In step 404, the client computer submits the job to the NRS computer. In step 408, the NRS computer checks its database to determine if a SC computer in its database can handle the job. If a suitable SC computer is not found, the NRS computer transmits a reject, signal to the client computer in step 412. If a suitable SC computer is available, the NRS computer transmits the job to the chosen SC computer in step 416.

When a job is received by the SC computer, the SC computer determines whether there is a job-shop appropriate to do the job in step 420. The job-shop typically corresponds to a program which handles the data or job transmitted to the SC computer. Usually the SC computer will handle the job without problems because the NRS computer already performed a screening comparing the job with the job-shop in the NRS computer database. However, unusual data not screened by standard job-shop descriptions may cause problems at the SC computer. When such a situation occurs, the SC computer will transmit a fail signal to the NRS computer in step 424.

Most of the time, the NRS computer's screening for appropriate job-shops using the database will result in confirmation of a match by the SC computer. The SC computer proceeds to execute the program corresponding to the job-shop which completes the job in step 424. If the job was not completed successfully in step 432, the SC computer forwards a fail signal to the NRS in step 424. If the job was completed successfully in step 432, the program results are returned to the NRS computer or the client computer in step 436.

Figure 5:
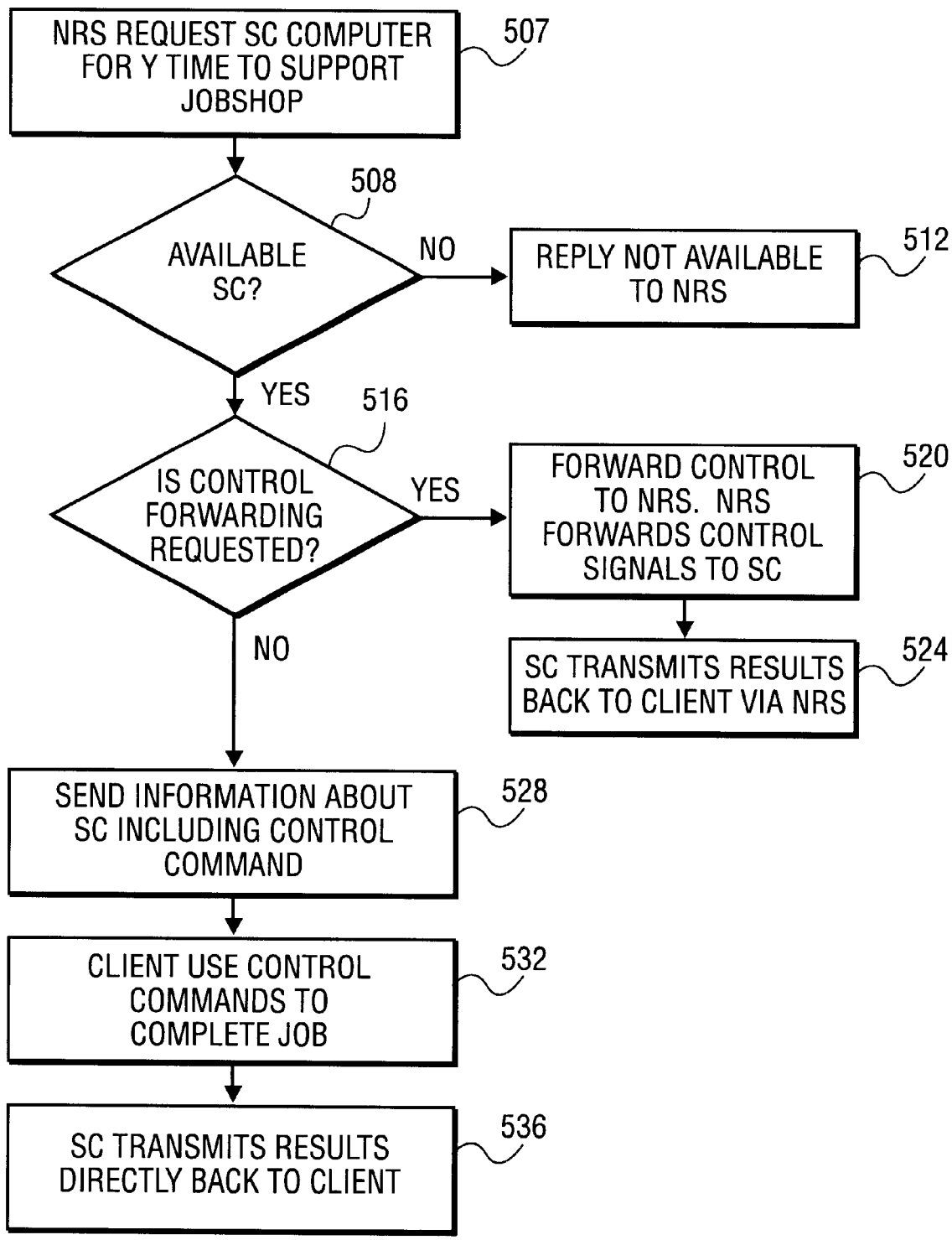
FIG. 5 is a flow diagram illustrating different methods of high end computer control of the job to be performed.

FIGS. 5 and 6 are diagrams illustrating different methods of controlling or assigning tasks to the SC computer. In one embodiment of the invention, the client computer will directly control SC computers performing the jobs from the client computer. In another embodiment of the invention, control signals will be routed via the NRS computer. FIG. 5 is a flow diagram illustrating the process in determining client computer control. FIG. 6 illustrates the flow of control signals from the client computer to the SC computer. In step 507 of FIG. 5, the client computer requests from the NRS computer at least one SC computer which supports a particular job-shop for a specific amount of time. In step 508, the NRS computer checks its database to determine if an available SC computer has published a job-shop corresponding to the job. If in step 508 no available SC computer is found to fulfill the requirements necessary to complete the job, then the NRS computer replies to the client computer that such a SC computer is not available in step 512.

When the NRS computer finds a SC computer which published an appropriate job-shop, the NRS computer determines whether "control forwarding" was requested in step 516. A request for control forwarding results in client computer control signals and SC responses being routed through the NRS computer. Routing a signal through the NRS computer provides additional security to the SC computer. However, the routing of signals through the NRS computers adds to the traffic of signals to the NRS computer and consumes NRS computer time. If control forwarding is not requested, signals may be directly routed between the client computer and the SC computer.

Figure 6A:
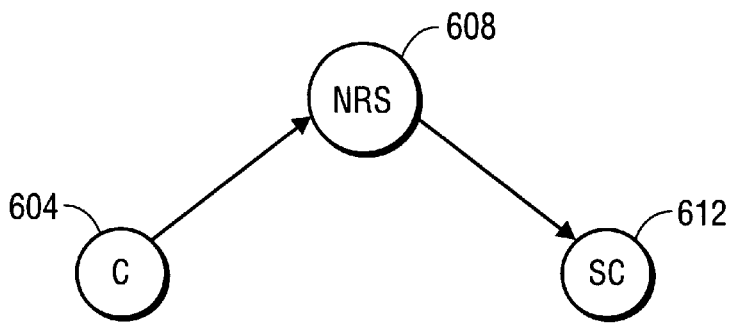
FIG. 6 is a flow diagram illustrating the decision making process in determining client computer control in a sub-contractor computer.
Figure 6B:
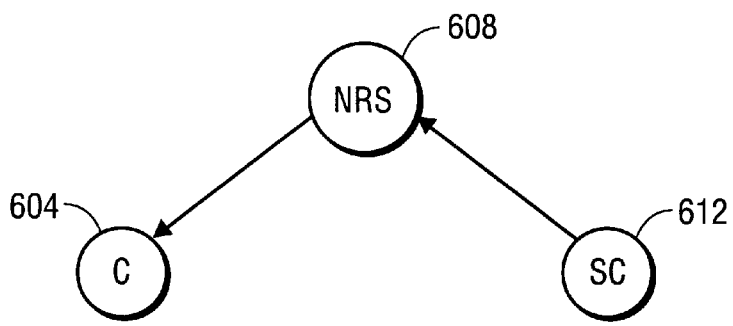

When control forwarding is requested in step 516, the client computer transmits control signals to the NRS computer which forwards the control signals to the SC computer in step 520. An illustration of the signal path is shown in FIG. 6a. In FIG. 6, the control signal travels from the client computer 604 through the NRS computer 608 to the SC computer 612. When the SC computer, completes the job, the SC computer transmits the results back to the client also via the NRS computer in step 524. The signal flow of the return transfer of the result is shown in FIG. 6b, which illustrates a signal traveling back from the SC computer 612 through the NRS computer 608 to the client computer 604.

Figure 6C:
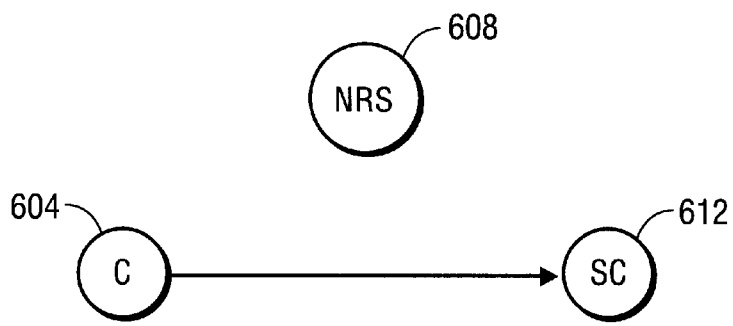
Figure 6D:
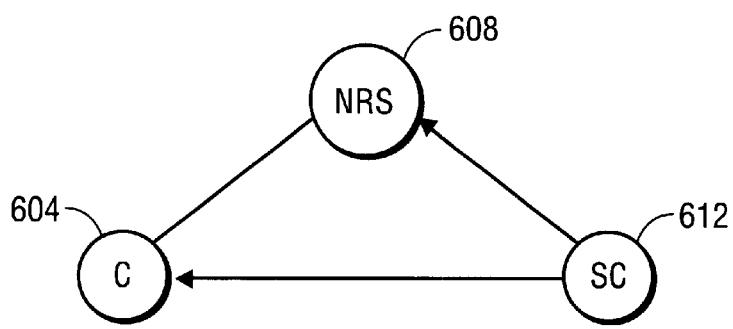

When in step 516, control forwarding has not been requested by either the SC computer or the client computer, the NRS computer transmits information about the available SC computer to the client computer in step 528 so that the client computer can directly address the SC computer. The information transmitted typically includes control commands. In step 532, the client computer uses control signals to direct the SC computer to complete the job. An illustration of such a signal flow is shown in FIG. 6c which shows information flow from the client computer 604 to the SC computer 612. Once the SC computer has completed processing the job from the client computer, the SC computer transmits the response directly back to the client computer in step 536. Such a transmission is illustrated in FIG. 6D where the completed job is routed from the SC computer 612 to the client computer 604. The SC computer may also forward a completion signal to the NRS to publish its availability for new jobs.

Figure 7:
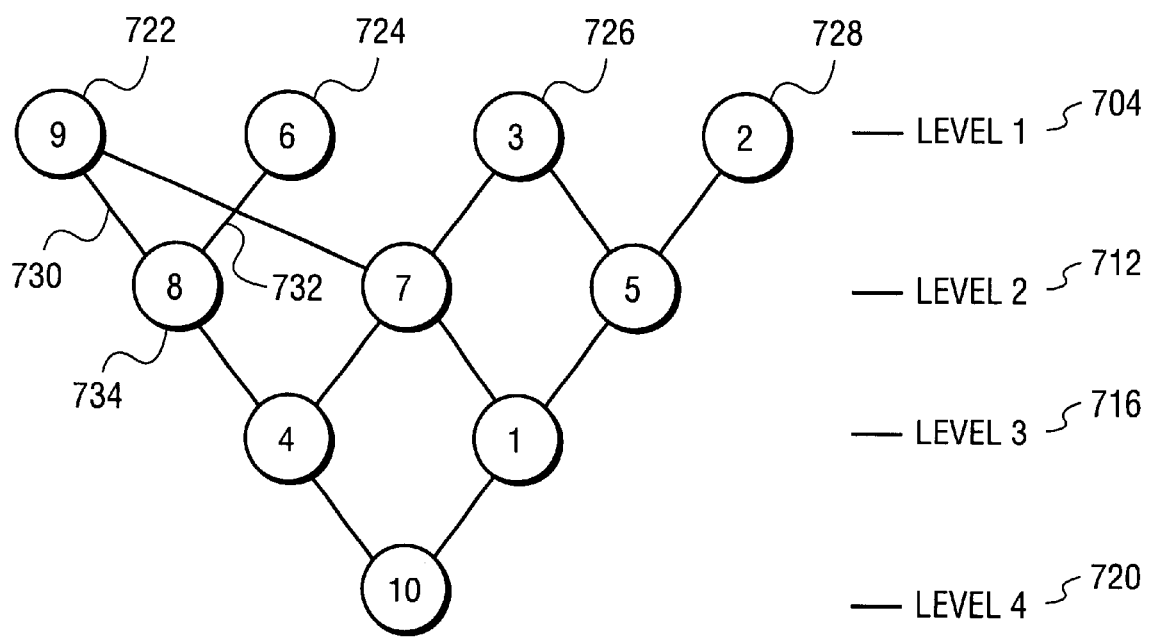
FIG. 7 is a diagram used to illustrate the inverse dependency order of modules of compiling tests.

FIG. 7 is a diagram illustrating the "inverse dependency order" of modules in a typical compiling task. A compiling task may typically be broken down into levels, 704, 712, 716, and 720. Each level may be further broken down into modules, such as modules 722, 724, 726, and 728 in a first level 704 (level 1). A module is a set of files or a grouping of subroutines which are related such that it is most efficient to compile a module on a single remote computer.

In traditional computing systems, all modules in a level, such as modules 722, 724, 726 and 728 of first level 704 are compiled before modules in the next or subsequent levels, such as second level 712 are compiled. The order of compiling is important because the intermediate output such as libraries, object modules, generated headers and the like from the earlier level, such as first level 704, are used to compile modules in subsequent or higher levels, 712, 716, 720. Distributing individual files in a module across different computers involves sending precompiler headers along with the files. The precompile headers typically get larger as the module size increases. Breaking up a module into individual files for separate compilation results in large transmission overhead because of the need to transfer the precompile headers and other dependent entities such as libraries, and object modules.

To reduce the transmission of headers in a distributed computing design, it is preferable to organize the compiling task into logical modules or "module packages". A "module package" typically includes several modules that are dependent on each other. In FIG. 7, such a dependent relationship is illustrated by interconnecting lines, 730, 732 interconnecting modules 722 and 724 of first level 704 and module 734 of second level 712. Packaging the three modules in a single package, allows the, package to be transmitted as a single job to an SC computer. In one embodiment, the SC computer begins compiling module 734 as soon as it completes the compilation of modules 722 and 724. In a second embodiment, module 722 and 724 are separately sent to two SC computers. The output of the two SC computers are recombined as a module packaged. A third SC computer may execute the recombination of the SC computer outputs and the subsequent compiling of the third module 734.

A client computer or designated distributed computing (D-comp) computer may be used to divide a compiling problem into modules and determine module packages. In an alternate embodiment, the breakdown of compiling tasks is done manually, and a dependency list is created. A computer uses the dependency list to complete the formation of module packages.

Figure 8:
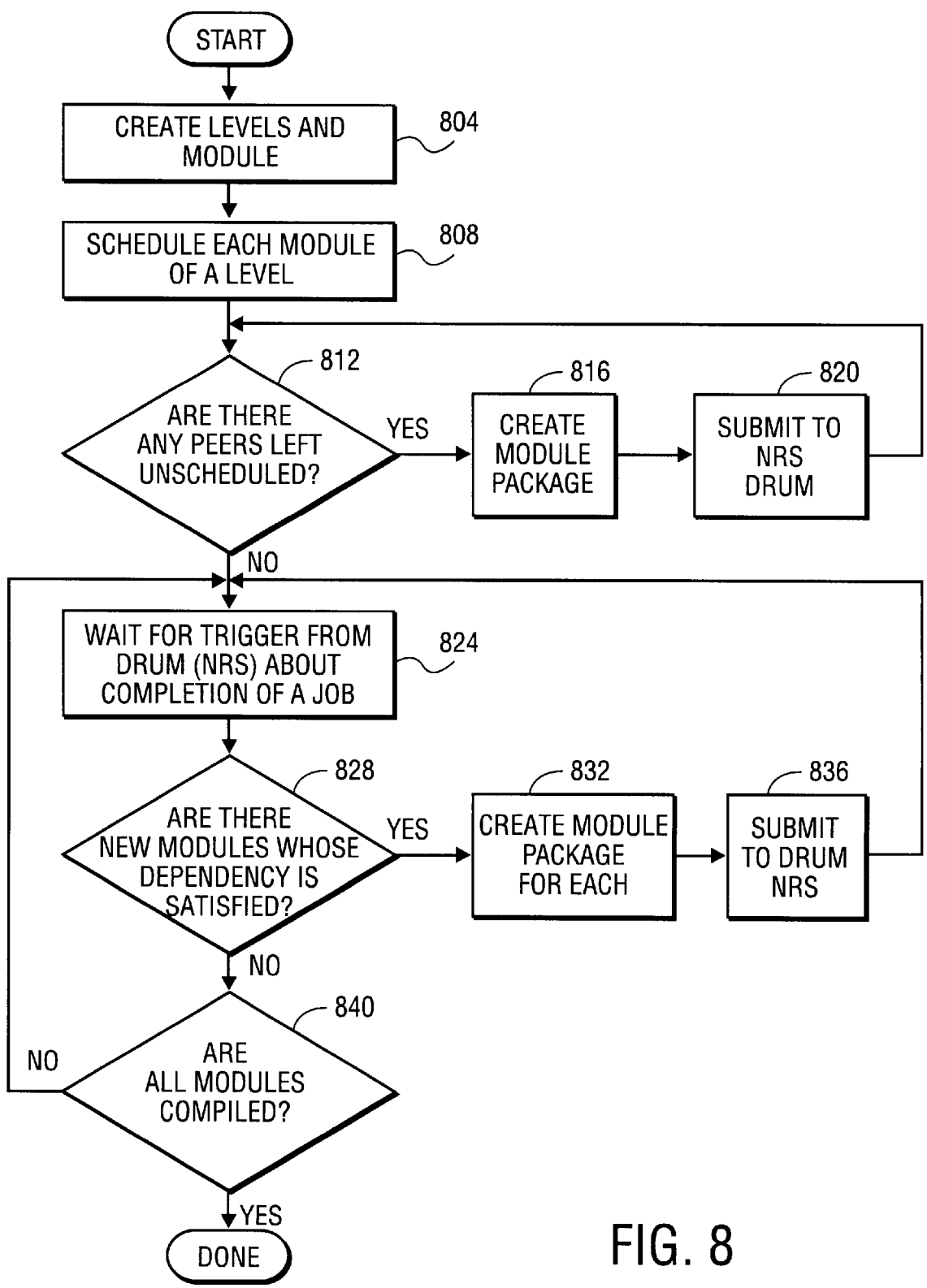
FIG. 8 is a flow diagram illustrating the steps executed by a computer in a distributed computing system to perform compiling of a program.

FIG. 8 is a flowchart illustrating the use of a client computer as a D-comp computer. In the embodiment illustrated in FIG. 8, the levels and module packages are created by a human operator in step 804. The D-comp computer receives the levels and modules and processes a level by scheduling each module in a level in step 808. When the modules received are not organized into module packages, the step of scheduling may include the process of determining a module's dependency on other modules, and creating a module package, including the module and dependent modules.

In step 812, the D-comp computer determines whether any peer modules are left unscheduled. Peer modules are modules which are on the same level. If there are peer modules left unscheduled, the D-comp creates a module package for the next unscheduled peer module in step 816. A module package typically includes the module being processed, and the relevant output of compiling the: dependent modules such as libraries, object modules and generated headers. The entire module package is submitted to the NRS in step 820, after which the system again determines whether there are any peer modules left unscheduled in step 812.

When in step 812, it is determined that there are no peer, modules left unscheduled on a level, all peer modules on a level have been submitted to an NRS. The D-comp computer waits for a "trigger", or signal, from the NRS, indicating that a job corresponding to the compiling of a module has been completed in step 824. When a job corresponding to the compiling of a module, has been completed, the NSR computer signals the D-comp computer. The D-comp computer proceeds to analyze whether there are new modules dependent on the job results in step 828. When there are higher level modules dependent on the job result generated in step 824, the D-comp computer creates a new module package including the output of dependent modules. This new module package is transmitted to the NRS in step 836 for further processing. After the new module package is transmitted, the D-comp computer returns to step 824, and waits for a trigger from the NRS indicating completion of the new module package.

When a trigger is received from the drum in step 824 indicating the completion of a job, and it is determined in step 828 that no new modules are dependent on the completed job, the D-comp computer determines whether all modules halve been processed in step 840. If all modules have not been processed, the system returns to step 824 and waits for a trigger from the NRS. When all modules have been processed in step 840, the system has completed the compiling task.

The described system provides a substantially more efficient way of completing complex compiling tasks. A system for billing a user for each task would assist tracking of costs. In particular, each organization or person owning a SC computer which assisted in the compiling task should be compensated for the computer time used. In order to facilitate billing, typically, the NRS computer or the SC computer will determine the resources used and charge it to the client computer. The resource measurements may be accomplished using one of two brokering techniques, either (1) direct brokering, or (2) indirect brokering. In indirect brokering, the client computer submits a task to the NRS computer and receives feedback as to the units of computer power, such as "mips" ("millions of instructions per second") and other resource utilization that is to be charged to the client computer. In a direct brokering model of billing, the client computer requests ownership of the resources for a fixed period of time, similar to a lease arrangement, and is charged a flat rate based on the quality and quantity of resources requested. In one embodiment of direct brokering NRS computer computes time allotted to each computer while the processing of jobs are directly handled by the client computer. Such an arrangement allows optimum use of network band width.

A number of examples have been illustrated in the preceding discussions. However, the specific examples presented were presented for illustrative purposes and should not be interpreted to limit the invention. The limits to the invention should be interpreted in terms of the claims as follows.

What is claimed:

1. A method of compiling comprising:

receiving a plurality of modules, each module in the plurality of modules representing a portion of a compiling task;

choosing a plurality of corresponding sub-contracting computers to process the plurality of modules, the choosing of the plurality of corresponding subcontracting computers based on job-shops generated by the corresponding sub-contracting computers;

transmitting each module as a job to a corresponding sub-contracting computer; and combining the output of the sub-contracting computers to generate a compiled task.

2. The method of claim 1 further comprising:

dividing a compiling task into levels, each level including at least one module.

3. The method of claim 2 further comprising:

scheduling each module on a level and proceeding to a next level only when each module on the level is scheduled.

4. The method of claim 1 further comprising:

creating a module package, the module package including modules which are interdependent, interdependent modules requiring compiled header information from another module within the module package.

5. The method of claim 4 wherein all modules in a module package are transmitted to one corresponding sub-contracting computer in the plurality of corresponding sub-contracting computers.

6. The method of claim 2 further comprising:

creating a module package, the module package including interdependent modules from different levels.

7. A network resource scheduling computer comprising:

a memory storing a plurality of job-shops corresponding to a plurality of sub-contracting computers;

a connection configured to receive a compiling task from a client computer; and a processor to match modules of the compiling task with matching job-shop.

8. The network resource scheduling computer of claim 7 wherein said connection is configured to transmit at least one module of the compiling task to a sub-contractor computer which published the matching job-shop.

9. The network resource scheduling computer of claim 7 wherein each module is identified with a job type identification so that the network resource computer job-type identification with the job-shops stored in memory.

10. The network resource scheduling computer of claim 7 wherein each module is tagged with a universally unique global identifier.

11. A sub-contractor computer comprising:

a memory to store a job-shop which describes the capabilities of the sub-contractor computer;

a connection to publish the job-shop to a network resource scheduling computer and to receive a module to be compiled from the network resource scheduling computer, the module to be compiled corresponding to the job-shop published;

and a processor for compiling the module and notifying the network resource scheduling computer of completion of the compiling of the module.

12. The sub-contracting computer of claim 11 wherein the sub-contractor computer receives a module package, the module package including several interdependent modules for compiling.

13. A network resource scheduling computer for handling a compiling task comprising:

a memory storing a plurality of job-shops corresponding to a plurality of sub-contractor computers;

a connection configured to receive modules representing portions of a compiling task from a client computer; and a processor to assign each module to a matching job-shop.

14. The network resource scheduling computer of claim 13 wherein said connection is configured to transmit a first module to a first sub-contractor computer which published a first matching job-shop.

15. The network resource scheduling computer of claim 13 further comprising:

a second connection configured to transmit a second module to a second sub-contractor computer which published a second matching job-shop.

16. The network resource scheduling computer of claim 13 wherein each module is a job which corresponds with a job-type identification so that the network resource scheduling computer can compare the job-type identification with the job-shops stored in the memory.

17. A sub-contractor computer comprising:

a memory to store a job-shop which describes the capabilities of the sub-contractor computer;

a connection configured to publish the job-shop to a network resource scheduling computer and to receive a matching job corresponding to a module of a compiling task from the network resource scheduling computer; and a processor for processing the matching job and notifying the network resource scheduling computer of completion of the matching job.

18. The sub-contractor computer of claim 17 wherein a result generated from processing the matching job is transmitted to a client computer which generated the matching job.

19. A method of processing tasks comprising:

generating a job-shop describing the capabilities of a sub-contractor computer;

publishing the job-shop;

receiving a job corresponding to a module of a compiling task;

matching the job to a published job-shop;

processing the job to produce a result; and transmitting the result to a client computer.

20. The method of claim 19 wherein said transmitting operation further comprises:

transmitting the result to a network resource scheduling computer, the network resource scheduling computer configured to forward the result to the client computer.

21. The method of claim 19 wherein the publishing operation is re-executed periodically to keep a network resource scheduling computer notified of the status of the sub-contracting computer.

* * * * *

UNITED STATES PATENT AND TRADEMARK OFFICE
CERTIFICATE OF CORRECTION

PATENT NO. : 6,487,577 B1
DATED : November 26, 2002
INVENTOR(S) : Sundararajan

It is certified that error appears in the above-identified patent and that said Letters Patent is hereby corrected as shown below:

Column 8,
Line 56, delete "packaged", insert -- package --.

Signed and Sealed this

Eighth Day of April, 2003

JAMES E. ROGAN
*Director of the United States Patent and Trademark Office*